United States Patent [19]

Blaha et al.

[11] 4,059,719
[45] Nov. 22, 1977

[54] PROCESS FOR FORMING BRANCHED NITROPOLYPHENYLENE

[75] Inventors: Eli W. Blaha, Wheaton, Ill.; Sandra K. Koster, Aiken, S.C.; Chen-Shen Wang, Naperville, Ill.

[73] Assignee: Standard Oil Company (Indiana), Chicago, Ill.

[21] Appl. No.: 681,751

[22] Filed: Apr. 29, 1976

[51] Int. Cl.$^2$ ............................................. C08F 8/00
[52] U.S. Cl. ........................................ 526/52; 260/2 H; 260/79.3 R; 260/79.3 A; 260/668 R; 260/670; 526/43; 526/46; 526/49; 526/346
[58] Field of Search ................. 260/79.3 R, 79.3 A, 260/2 H; 526/43, 46, 49, 52, 346

[56] References Cited

U.S. PATENT DOCUMENTS

| 2,958,686 | 11/1960 | Dunham et al. | 528/483 |
|---|---|---|---|
| 3,143,534 | 8/1964 | Herrick | 260/79.3 A |
| 3,547,866 | 12/1970 | Trieschmann et al. | 526/43 |
| 3,792,099 | 2/1974 | Wang et al. | 260/670 |
| 3,798,281 | 3/1974 | Wang | 260/670 |
| 3,829,518 | 8/1974 | Wennergerg | 260/670 |
| 3,855,332 | 12/1974 | Wang | 260/670 |
| 3,857,833 | 12/1974 | Warzecha et al. | 536/101 |
| 3,974,121 | 8/1976 | Wang | 260/2 H |

FOREIGN PATENT DOCUMENTS

| 2,129,336 | 12/1971 | Germany | 526/52 |
|---|---|---|---|
| 778,761 | 7/1957 | United Kingdom | 526/43 |
| 799,952 | 8/1958 | United Kingdom | 526/43 |

Primary Examiner—Ronald W. Griffin
Attorney, Agent, or Firm—Wallace L. Oliver; Arthur G. Gilkes; William T. McClain

[57] ABSTRACT

Solid aromatic polymers, such as branched polyphenylenes, are reacted with a reactive gas such as a $NO_2$-$N_2O_4$ mixture, chlorine and sulfur trioxide without solvent or catalyst. The extent of reaction depends on reaction time and temperature and on the concentration of the reactive gas.

4 Claims, 2 Drawing Figures

PROCESS FOR FORMING BRANCHED NITROPOLYPHENYLENE

BACKGROUND OF THE INVENTION

This invention relates to forming substituted solid aromatic polymers.

Branched nitropolyphenylenes mixed with branched polyphenylenes are useful in preparing superior glass, graphite and carbon fiber composites. Such mixtures and composites are described in detail in U.S. Patent application Ser. No. 635,034 filed Nov. 25, 1975, now U.S. Pat. No. 3,974,121 incorporated herein by reference. Additionally, the nitropolyphenylenes can be reduced with such agents as tin to form aminopolyphenylenes which, in turn, can be polymerized further with polyfunctional acids or anhydrides or their respective chlorides, such as 4-trimellitoyl chloride anhydride, pyromellitic anhydride and the like, to form a polyphenylene amide-imide polymer. Such amide-imide polymers can be used in laminates. Sulfonated polyphenylenes can be used as cross-linking agents in forming glass composites and as ion exchange resins. These sulfonated polyphenylenes can be either water soluble or insoluble depending on the degree of sulfonation. Chloropolyphenylenes are useful as cross-linking agents in graphite and glass fiber composites. The branched polyphenylenes on which these substituted polyphenylenes are based are those novel branched polyphenylenes which possess increased solubility and thermal stability over a number average molecular weight range from about 1000 to over 10,000 which are described in U.S. Pat. Nos. 3,792,099, 3,855,332, 3,829,518 and 3,789,281 all incorporated by reference herein. Branched polyphenylenes have been found useful in high-temperature, corrosive conditions such as a binder for graphite powder in fuel cell plates, in ablative materials and in brake shoes. Such polyphenylenes also can be alkylated using boron trifluoride-formic acid catalysts to form oil additives or grease thickeners.

The nitropolyphenylenes described in Ser. No. 635,034 were produced by nitrating branched polyphenylene with a nitric acid-sulfuric acid mixture. Although such method produces suitable nitropolyphenylenes, the process has inherent disadvantages such as using highly corrosive acids which require a large volume of water to terminate the reaction and precipitate the product. Product filtration is often slow and requires extensive water washing and cumbersome spent acid disposal. Similarly, sulfonated polyphenylenes can be produced using sulfuric acid, however, such a method suffers from the same disadvantages as the above-described nitration procedure. There is a need for a convenient, easily controlled process which does not require extensive product work-up procedures. An especially preferred method would require neither solvent nor catalyst.

It is known to the art that aromatic systems can be nitrated with $N_2O_4$ in solution in the presence or absence of various catalysts such as aluminum chloride, $P_2O_5$, Lewis acid catalyst (e.g. $BF_3$), p-chlorobenzoic acid, and palladium and thallium compounds. Benzene has been nitrated with $N_2O_4$ induced by gamma radiation. Natural rubber possibly has been nitrated in benzene or dichlorobenzene solution using $N_2O_4$. Biphenyl has been nitrated with excess liquid $N_2O_4$ in the absence of ultraviolet light. Pyridine and toluene have been nitrated in the gaseous phase with $N_2O_4$.

SUMMARY OF THE INVENTION

This invention comprises a method for placing substituent groups on a solid aromatic polymer comprising contacting the solid aromatic polymer in a finely divided state for an effective time with a suitable reactive gas.

Figure 2:
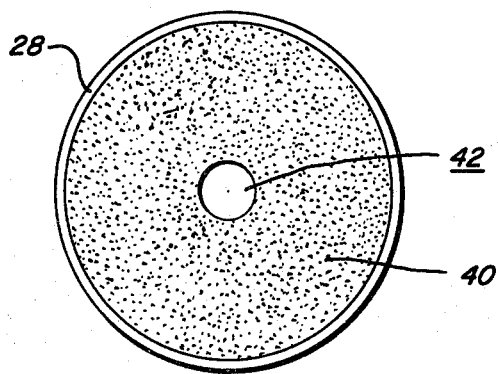

The lid 28 (FIG. 2) contains a gas-porous portion 40 in which a central hole 42 is placed through which the thermal well passes.

BRIEF DESCRIPTION OF THE INVENTION

We have found that a finely-divided, solid aromatic polymer can be substituted to a predetermined extent by contacting such polymer with an electrophilic reactive gas at room temperature or above for a few minutes.

The solid aromatic polymer useful in this invention can be any polymeric substance in which aromatic groups, such as phenyl, substituted phenyl, biphenyl, polyphenyl, naphthal, polynaphthal and the like, are incorporated. The preferred solid aromatic polymer are those branched polyphenylenes described in U.S. Patent application Ser. No. 635,034 filed Nov. 25, 1975.

The reactive gas of this invention can be any gas capable of aromatic substitution in the gas phase. Preferable reactive gases include dinitrogen tetroxide, sulphur trioxide and halogens such as fluorine, chlorine and bromine. Other suitable reactive gases include cyanogen, cyanogen halide, sulfur dioxide, alkyl halide and acyl chloride. Although it is believed that an electrophilic substitution mechanism is involved in the reactions of this invention, the exact mechanism is not known. The direct gas to solid phase reaction without a catalyst in this invention contrasts with the well-known electrophilic substitution reactions which need an acid catalyst and are performed in solution.

In order that substantial amounts of solid polymer can be reacted, such polymer should be in a finely divided state. Preferably, most such finely divided polymer should pass through a 100 mesh screen. In a typical polyphenylene powdered in a blender, a typical average particle size distribution is given in Table I.

TABLE I

| Mesh Size | % |
|---|---|
| 70–100 | 40 |
| 140 | 15 |
| 200 | 12 |
| 270 | 11 |
| 325 | 7 |

TABLE I-continued

| Mesh Size | % |
| --- | --- |
| 400 | 4 |
| Fines | 11 |

The substitution reactions of this invention typically take only a few minutes such that contact times of 5 to 35 minutes with the reactive gas usually are sufficient. Generally the longer the contact time, the greater is the extent of substitution. For example, nitrations at room temperature in a nitrogen or air flow system with reaction times of 15 to 30 minutes yield nitropolyphenylenes containing about 0.5 to 4.5% nitrogen. A level of 2.33% nitrogen corresponds to one nitro group for every eight phenyl rings.

The substitution method described in this invention particularly is useful because of the ease of controlling the extent of reaction. Factors which can be controlled include the time of reaction, the concentration of the reactant gas, the temperature, and the size of the polymer particles. Another method of controlling the extent of reaction is dilution of the reactive gas with a diluent gas, such that the greater the concentration of the reactive gas, the greater is the extent of substitution. Typically, nitrogen is used as a diluent, although any gas inert under the reaction conditions can be used. In nitrations even air has been used with no apparent complications. The skilled artisan can use these parameters to produce a polymer substituted to a predetermined extent.

After the reaction is complete, the substituted polymer conveniently can be freed of excess by-products (e.g. nitrous acid) by a simple water treatment. Alternatively, the product can be flushed with an inert gas such as nitrogen and then heated in a vacuum oven (e.g. 20° C, 20 torr) for a sufficient time to remove traces of nitrous acid vapor.

In a typical reaction apparatus the reactive gas and diluent gas are metered into a reaction chamber through a gas-porous barrier plate such as scintered glass. Conveniently, powdered polyphenylene rests above the gas-porous plate such that the reactive gas passes through the solid powder. A gas exit is provided from the reaction chamber which leads to a trap or recycling system. The reaction chamber can be heated by any convenient means.

Under non-fluidized bed or other agitation conditions there can be a concentration gradient of reactive gas in other powder-filled reaction chambers which can lead to variations of substitution in the product. For example, in a 40 mm (o.d.) reactor with a 20 gram capacity a variation in nitrated product was found ranging from 1.3% nitrogen content in the top product of 1.6% nitrogen in the bottom product. A similar experiment found 1.6% nitrogen in the top quarter but 2.1% nitrogen in the bottom quarter of the reactor. Such variations can be altered by different reactor geometries or agitation of the solid polymer during reaction.

One reactive gas used in this invention is dinitrogen tetroxide which exists in equilibrium with nitrogen dioxide according to the following equation:

$$2NO_2 \rightleftharpoons N_2O_4$$

It is believed that the overall reaction of an aromatic hydrocarbon (ArH) and $N_2O_4$ is described as follows:

$$ArH + N_2O_4 \rightarrow ArNO_2 + HNO_2$$

The nitration reaction of this invention typically occurs at about room temperature. Although higher temperatures are operative, the low temperature limit depends on the dilution of the $N_2O_4$ with inert gases, since $N_2O_4$ condenses at 21.2° C. Dilution of the $N_2O_4$ with a lower condensing gas such as nitrogen will permit a lower reaction temperature.

In nitrating according to this invention, a known amount of $N_2O_4$ gas can be condensed into a reaction vessel containing a powdered aromatic polymer and the vessel agitated to promote uniform contact between the particles and the gas. After a sufficient reaction time, the polymer is flushed with an inert gas to remove excess $NO_2-N_2O_4$ and the nitrated product washed with water to remove the nitrous acid byproduct. The extent of nitration can be controlled by varying the time and temperature of the reaction. Alternatively, the reaction can occur in a flow system in which $N_2O_4$ gas typically is mixed with an inert diluent gas and the mixture passed through powdered polymer. The extent of nitration additionally can be controlled by the concentration of the reactive gas in the total gas mixture and by the flow rates. After the nitration is accomplished the product can be flushed with inert gas and washed with water. An advantage in this nitration method is the avoidance of sulfonation reactions which occur in a nitric acid-sulfuric acid system.

A number of nitration runs were made using varying flow rates of $NO_2-N_2O_4$ and $N_2$ on a 20-gram sample reacted for about 20 minutes. The efficiencies were calculated based on the nitration reaction given above such that an efficiency of 100% means that half of the nitrogen in the reactive gas was incorporated in the polymer product. Typically the efficiency is about 50-65%, however efficiencies above 100% can be obtained using an air diluent at a low flow rate. Presumably, in this case the nitrous acid by-product is reoxidized to $NO_2$. The data are given in Table II.

TABLE II

| No. of Samples | $N_2$ Flow Rate (g/min) | $NO_2-N_2O_4$ Flow Rate (g/min) | Temp. | Average % N | Average Efficiency (%) |
| --- | --- | --- | --- | --- | --- |
| 77 | 0.5 | 0.3 | ambient | 1.88 | 43.42 |
| 10 | 0.4 | 0.3 | ambient | 2.20 | 50.93 |
| 10 | 0.2 | 0.2 | ambient | 2.23 | 65.40 |
| 1 | 0.5 | 0.3 | ambient | 2.38 | 54.96 |
| 4 | 0.2 | 0.2 | ambient | 3.53 | 103.52 |
| 1 | 0.2 | 0.08 | 40° C | 0.85 | 77.3 |

Similarly, a polyphenylene can be chlorinated by passing chlorine gas mixed with an diluent gas through powdered polyphenylene without solvent or catalyst. The overall reaction is believed to be:

$$ArH + Cl_2 \rightarrow ArCl + HCl$$

The product is worked-up by flushing with an inert gas to remove traces of $Cl_2$ and HCl. The extent of chlorination in the product has ranged in experimental runs from 3 to 19 wt.%. Under similar conditions the chlorination reaction yields a better efficiency than nitration. Typically, a chlorination will yield an efficiency of greater than 90%, however, reactions performed in the dark give lower efficiency ratings. Chlorinations using a polyphenylene mixed with aluminum chloride yield no beneficial results.

Sulfonation reactions are performed using procedures similar to those described for nitration and chlorination except that the reactive gas mixture is formed by bubbling nitrogen gas through liquid sulfur trioxide. The overall reaction is believed to be:

$$ArH + 2SO_3 \rightarrow ArS_2O_6H \xrightarrow{H_2O} ArSO_3H + H_2SO_4$$

This invention is demonstrated but not limited by the following examples.

EXAMPLES I-XXII

Figure 1:
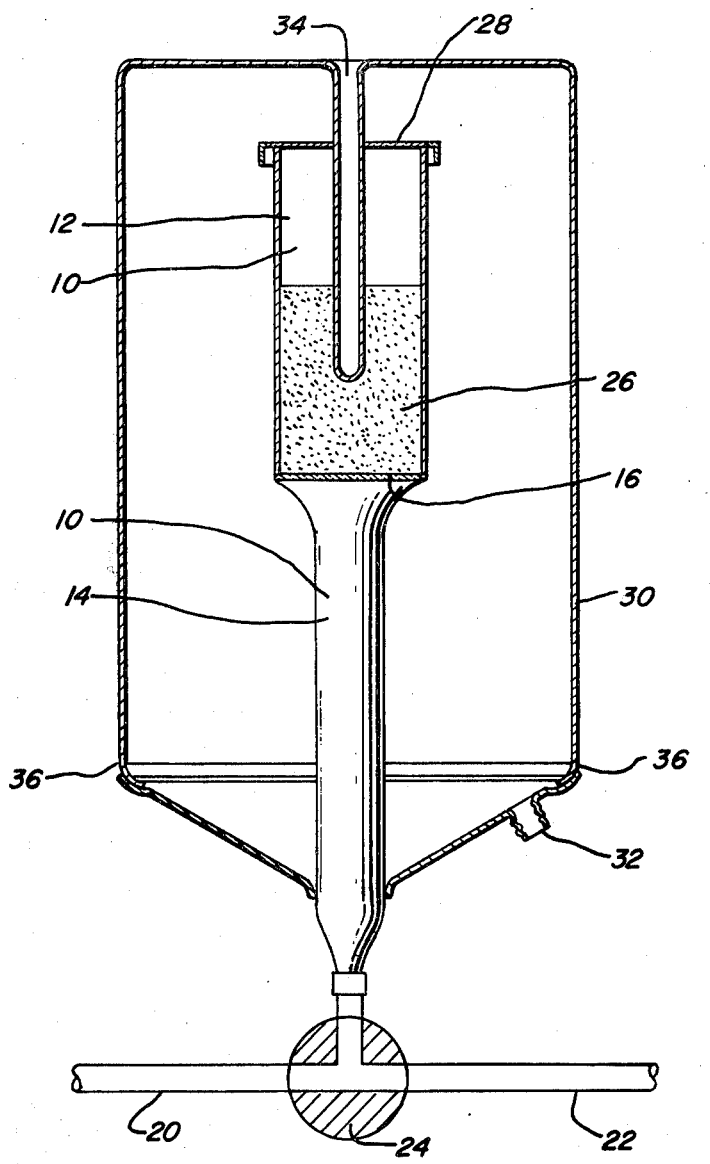
FIG. 1 shows a typical reactor in which the process of this invention can be performed. The reactor comprises a cylindrical inner chamber 10 separated into an upper reaction chamber 12 and a lower chamber 14 by a gas-porous barrier plate 16. Reactive gas and diluent gas are metered (flowmeters not shown) through inlets 20 and 22 by way of a three-way stopcock 24 into the lower chamber 14. The gas mixture passes through the porous barrier plate 16 and reacts with the solid aromatic polymer 26. Excess gas escapes the reaction chamber through lid 28 and passes into a cylindrical outer chamber 30 from which the gases exit through outlet tube 32 into a trap (not shown). A thermal well 34 is provided in which a thermometer or thermocouple can be placed to monitor the reaction. The outer chamber is jointed to the inner chamber by a ground-glass joint 36.

A series of branched polyphenylenes prepared according to the procedures described in U.S. Pat. No. 3,792,099 using a molybdenum oxide on silica-alumina catalyst and having a molecular weight of about 6000 were nitrated using a $NO_2$-$N_2O_4$ gas system. Generally, a sample of the polyphenylene which was powdered in a blender was placed in a scintered glass-bottomed vessel as shown in FIG. 1 at room temperature. After the system was flushed with nitrogen, a $NO_2$-$N_2O_4$ mixture diluted with nitrogen was passed through the polymer while excess reactive gas was either collected in a dry-ice trap or decomposed in aqueous alkali. After 20 to 30 minutes, the $NO_2$-$N_2O_4$ was shut off and the system flushed with nitrogen for at least 30 minutes. The resulting powdered product was washed with water and filtered and then either oven or air dried. The nitro functionality in the product was comfirmed by infrared bands at 1340 $cm^{-1}$ and 1520 $cm^{-1}$ which are identical to spectra obtained from polyphenylenes nitrated with nitric acid-sulfuric acid system. Results of such nitrations are shown in Table III. In some instances multiple runs were made using identical conditions and the resulting nitrated product combined for analysis.

EXAMPLES XXIII-XXVI

A series of nitration reactions were performed on branched polyphenylenes having an inherent viscosity (I.V.) of 0.07 in the apparatus described in Examples I-XXII and shown in FIG. 1. The flow rates for $N_2O_4$ and the diluent gas were 0.30 and 0.49 g./min., respectively and the reaction took 20 minutes at room temperature. Two runs were worked-up without water washing by drying the product in a vacuum (20 torr) oven at 80° C overnight to remove excess nitrogen oxides. Using air instead of nitrogen as the diluent gas seemingly increases the nitrogen content in the product slightly, while eliminating water washing has little apparent effect. These nitropolyphenylenes were used to prepare asbestos composites. A mixture containing 10% (by weight) nitropolyphenylene, 30% branched polyphenylene (inherent viscosity = 0.06) and 60% asbestos was placed in a well-ventilated hydraulic press at 950° F at 3200 psi for 30 minutes. Flexural modulus and flexural strength were measured before and after aging the composite for 14 days at 600° F in air. The results are given in TABLE IV.

TABLE IV

| Example | Diluent Gas | Work-up | % N in product | Product inherent viscosity | Asbestos Composite Properties | | | |
|---|---|---|---|---|---|---|---|---|
| | | | | | Before Aging | | After Aging | |
| | | | | | Flexural Strength (psi) | Flexural Modulus ($10^3$ psi) | Flexural Strength (psi) | Flexural Modulus ($10^3$ psi) |
| XXIII | nitrogen | water | 1.96 | 0.09 | 10,800 | 2,051 | 8,100 | 539 |
| XXIV | nitrogen | oven | 2.11 | 0.08 | 9,400 | 1,920 | 3,200 | 483 |
| XXV | dry air | oven | 2.33 | 0.06 | 11,600 | 1,980 | 5,000 | 752 |
| XXVI | dry air | water | 2.38 | 0.07 | 11,200 | 1,853 | 10,000 | 1,325 |

EXAMPLE XXVI

Twenty grams of branched polyphenylene (I.V. = 0.10) were placed in a nitrogen-flushed, thoroughly-dried reactor described in Examples I-XXII. Nitrogen gas was bubbled through 10 milliliters of liquid sulfur trioxide maintained at about 35° C and the resulting gas stream was passed through the polyphenylene for about two hours until the $SO_3$ was consumed. After flushing with nitrogen for about 1½ hours, the product was removed, washed with water, filtered and dried in a vacuum oven at 95° C. The product contained 6.0% sulfur which corresponds to an efficiency of 51% based on

TABLE III

| Example | Amount of Sample (g) | Polyphenylene Softening Point (° C) | $N_2$ Flow Rate (g/min.) | $NO_2$-$N_2O_4$ Flow Rate (g/min.) | Reaction Time (min.) | % N In Product | Nitrated Polyphenylene Softening Point (° C) |
|---|---|---|---|---|---|---|---|
| I | 20 | — | 0.49 | 0.30 | 30 | 2.54 | — |
| II | 20 | 192 | 0.49 | 0.30 | 27 | 2.72 | 226 |
| III | 3 × 20 | 192 | 0.49 | 0.30 | 28 | 2.02 | 205 |
| IV | 3 × 20 | 192 | 0.49 | 0.30 | 25 | 2.10 | 210 |
| V | 20 | 200 | 0.49 | 0.26 | 20 | 1.49 | 205 |
| VI | 2 × 20 | 200 | 0.49 | 0.30 | 20 | 2.02 | 232 |
| VII | 3 × 20 | 192 | 0.49 | 0.30 | 20 | 1.82 | 209 |
| VIII | 20 | 192 | 0.49 | 0.30 | 15 | 1.80 | 205 |
| IX | 4 × 20 | 190 | 0.49 | 0.30 | 20 | 2.12 | 212 |
| X | 4 × 20 | 190 | 0.49 | 0.30 | 20 | 2.52 | 214 |
| XI | 4 × 20 | 186 | 0.49 | 0.30 | 20 | 2.17 | 228 |
| XII | 3 × 20 | 194 | 0.49 | 0.30 | 20 | 1.69 | 202 |
| XIII | 4 × 20 | 202 | 0.49 | 0.30 | 20 | 1.75 | 205 |
| XIV | 4 × 20 | 190 | 0.49 | 0.30 | 20 | 1.93 | 230 |
| XV | 4 × 20 | 202 | 0.49 | 0.30 | 20 | 1.94 | 215 |
| XVI | 4 × 20 | 190 | 0.49 | 0.30 | 20 | 2.17 | 247 |
| XVII | 4 × 20 | 168 | 0.49 | 0.30 | 20 | 1.51 | 189 |
| XVIII | 20 | 168 | 0.23 | 0.23 | 20 | 1.54 | 201 |
| XIX | 20 | 168 | 0.23 | 0.09 | 20 | 1.10 | 180 |
| XX | 20 | 168 | 0.23 | 0.30 | 20 | 3.11 | 215 |
| XXI | 20 | 168 | 0.23 | 0.30 | 20 | 2.98 | 200 |
| XXII | 4 × 20 | 203 | 0.49 | 0.30 | 20 | 1.67 | 243 | half the amount of SO$_3$ added. The sulfonated product showed a characteristic infrared band at 1175 cm$^{-1}$.

EXAMPLE XXVII

Twenty grams of branched polyphenylene (IV = 0.06) were sulfonated using the procedure of Example XXVII. The product contained 14% sulfur.

EXAMPLES XXIX–XXXII

Twenty grams of branched polyphenylene (I.V. = 0.06) were placed in a nitrogen-flushed reactor described in Examples I–XXII. Chlorine gas mixed with nitrogen was passed through the polyphenylene powder for 20 to 30 minutes at ambient temperature. After flushing with nitrogen the product was placed in a vacuum oven at 90° C to remove any residual gas. The chlorinated product showed aryl-chlorine infrared absorbances in the 600–800 cm$^{-1}$ region. The results are shown in Table V.

The method of this invention is a convenient, relatively simple reaction method for substituting on a solid aromatic polymer without catalyst which involves no change of state through the reaction, which can be controlled easily, which is fast and which can be worked up easily. Another major advantage of this method is its suitability to a continuous process, whereby solid polymer can be conveyed through a reaction zone.

We claim:

1. A process for preparing branched nitropolyphenylene comprising contacting finely-divided, solid branched polyphenylene with a dinitrogen tetraoxide-nitrogen dioxide gas mixture in the absence of a liquid diluent.

2. The process of claim 1 wherein the dinitrogen tetraoxide-nitrogen dioxide mixture is diluted with a diluent gas.

3. The process of claim 2 wherein the diluent gas is nitrogen.

4. The process of claim 1 wherein most of the finely-divided branched polyphenylene can pass through a 100 mesh screen.

TABLE V

| Example | No. of Samples | N$_2$ Flow Rate (g/min.) | Cl$_2$ Flow Rate (g/min.) | Reaction Time (min.) | Temperature | Average % Cl | Average Efficiency |
|---|---|---|---|---|---|---|---|
| XXIX | 1 | — | 0.5 | 17 | Ambient | 15.9 | 91.9% |
| XXX | 1 | 0.1 | 0.3 | 30 | Ambient | 18.7 | 103.0% |
| XXXI[(1)] | 1 | 0.1 | 0.3 | 30 | Ambient | 10.5 | 57.7% |
| XXXII | 4 | 0.3 | 0.2 | 30 | Ambient | 12.6 | 85.0% |
| XXXIII | 2 | 0.2 | 0.2 | 30 | Ambient | 13.7 | 92.4% |

[(1)]Reactor wrapped in foil.